UNITED STATES PATENT OFFICE.

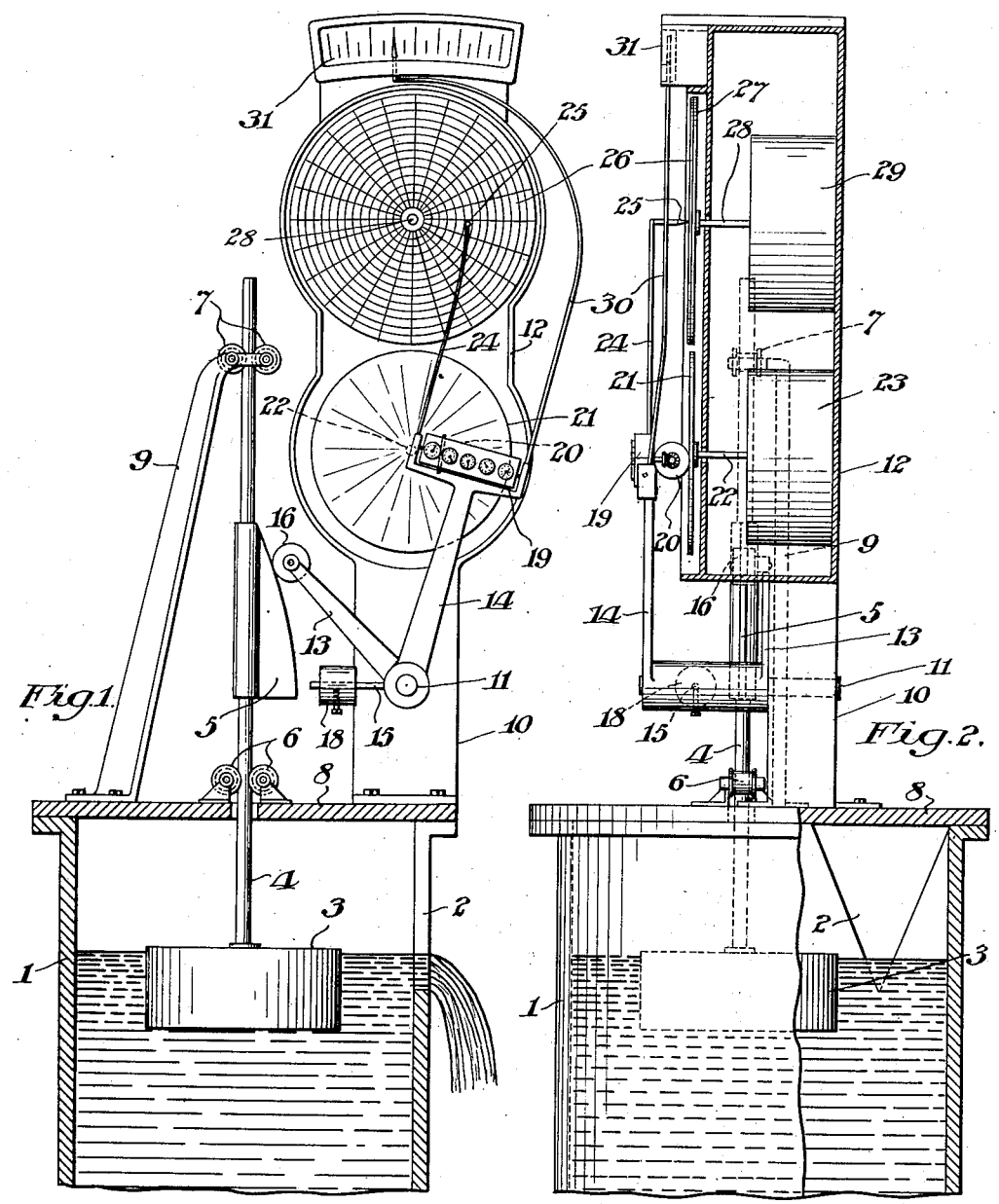

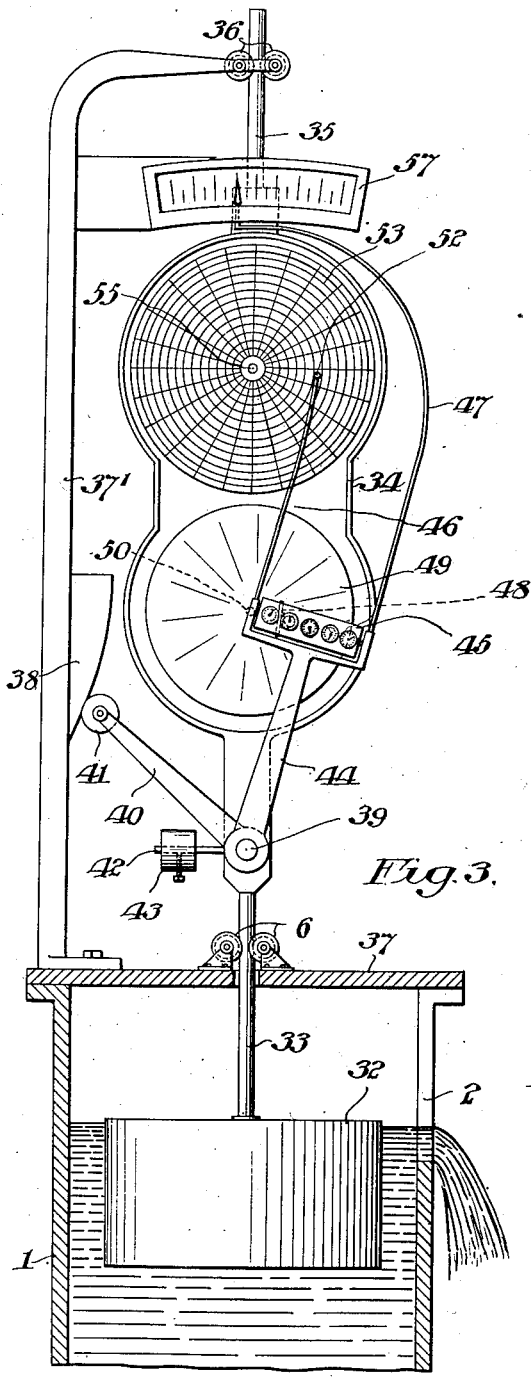
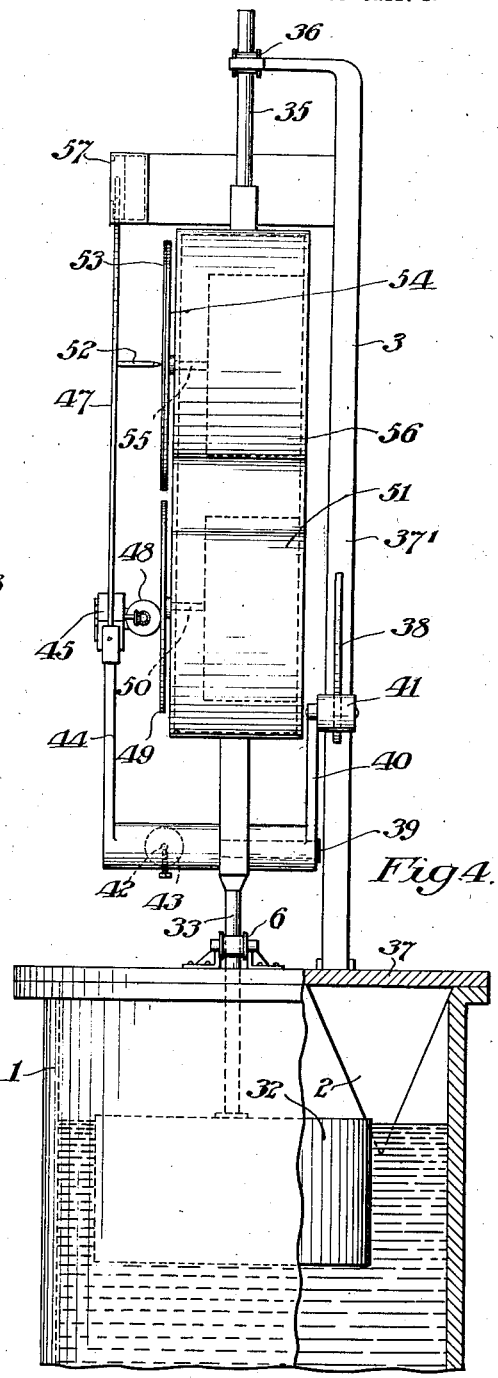

MORO M. BORDEN, OF COLLINGSWOOD, NEW JERSEY, ASSIGNOR TO SIMPLEX VALVE & METER COMPANY, OF PHILADELPHIA, PENNSYLVANIA, A CORPORATION OF NEW JERSEY.

FLUID-METER.

1,296,041.        Specification of Letters Patent.        Patented Mar. 4, 1919.

Application filed July 7, 1917. Serial No. 179,138.

*To all whom it may concern:*

Be it known that I, MORO M. BORDEN, a citizen of the United States, residing at Collingswood, in the county of Camden and State of New Jersey, have invented certain Improvements in Fluid-Meters, of which the following is a specification.

This invention is an improved meter designed for measuring the flow of fluids accurately and efficiently by simple mechanism adapted for registering, recording and indicating the flow.

In its preferred form, my invention comprises the combination of a cam with oscillatory lever mechanism operated thereby for effecting a desired differential action of indicating, recording and registering mechanism, the movement being controlled by changes in head of the fluid acting through a reciprocatory device, such as a float.

The characteristic features of my invention are fully disclosed in the following description and the accompanying drawings in illustration thereof.

In the drawings, Figure 1 is a part sectional elevation of mechanism embodying my invention; Fig. 2 is a part sectional elevation thereof taken at right angles to the position illustrated in Fig. 1; Fig. 3 is a part sectional elevation illustrating a modified construction; and Fig. 4 is a part sectional elevation of the same taken at right angles to the position shown in Fig. 3.

In the embodiment of my invention illustrated in Figs. 1 and 2, a conduit 1 is provided with an orifice or notch 2 for the discharge of a liquid subject to a variable head. A float 3 has fixed thereto a vertically movable rod 4 to which is fixed a cam 5, the rod being maintained in vertical position by guide rollers 6 and 7 journaled in the respective supports 8 and 9.

A strut 10 fixed to the cover 8 carries an arbor 11 and a housing 12, the arbor having fulcrumed thereon a crank lever comprising arms 13, 14 and 15. The arm 13 is provided with a roller 16 for engaging the cam 5, whereby the crank lever is rocked by the movement of the cam. The arm 15 is provided with a weight 18 for holding the roller 16 constantly in contact with the cam and counter-balancing the weight of the arm 14 and the mechanism carried thereby. The arm 14 carries a registering mechanism 19 operable by a traction wheel 20 thereof movable between the center and periphery of a disk 21, the disk being fixed on an arbor 22 journaled in the housing and revolved at a constant rate by clock mechanism 23. The arm 14 also has fixed thereto a finger 24 provided with a marker 25 movable between the center and periphery of and marking a chart 26, the latter being carried by a constantly revolving disk 27 mounted on an arbor 28 which is revolved at a uniform rate by clock mechanism 29. The arm 14 further carries a pointer 30 movable thereby over a scale or dial 31.

It will be understood that when the rate of flow of the liquid is at the minimum, its level is at the bottom of the notch 2, the float 3 and cam 5 occupying corresponding positions in which the roller 16 is at its extreme position to the left, the traction wheel 20 is at the center of the disk 21, the marker 25 is at the center of the chart 26, and the pointer 30 is at the zero position on the scale 31. As the head rises and the flow increases, the float 3 and cam 5 are elevated proportionately, the cam acting through the roller 16 and arm 13 on the arm 14 to move the traction wheel 20 from the center toward the periphery of the disk 21, the marker 25 from the center toward the periphery of the chart 26, and the indicator 30 from the zero position over the scale 31, and effecting the correct registration, recording and indication of the flow.

In the form of the invention illustrated in Figs. 3 and 4, the conduit 1, provided with the discharge notch 2, contains the float 32 which carries the integrally connected rod 33, housing 34 and rod 35, the float supported mechanism being vertically movable under control of rollers 6 mounted on the cover 37 of the conduit and engaging the rod 33 and rollers 36 mounted on a strut 37', fixed to the cover 37, and engaging the rod 35. The strut 37' has fixed thereto a cam 38. An arbor 39, fixed relatively to the rod 33, has fulcrumed thereon a crank lever comprising an arm 40 provided with a roller 41 for engaging the cam 38, an arm 42 provided with a weight 43 for holding the roller in contact with the cam, and an arm 44 carrying a register 45, a finger 46, and a pointer 47.

The register 45 has a traction wheel 48 movable between the center and periphery of a constantly revolving disk 49 which is mounted on an arbor 50 operated by clock mechanism 51 in the housing 34. The finger 46 carries a marker 52 movable between the center and periphery of a chart 53 which is carried by a constantly revolving disk 54, the latter being mounted on an arbor 55 of clock mechanism 56 in the housing. The pointer 47 is movable over a scale 57 carried by the housing.

In the operation of this form of the device, when the flow is at the minimum, the float 32, together with the parts movable therewith, occupy their lowest position, the roller 41 being in its position farthest to the left, the traction wheel 48 being in the center of the disk 49, the marker 52 being at the center of the chart 53, and the pointer 47 being at zero on the scale 57. As the head rises, the float 32 and the parts carried thereby are elevated proportionately, the cam 38 acting through the roller 41 and arm 40 on the arm 44 to move the roller 48 from the center toward the periphery of the disk 49, the marker 52 from the center toward the periphery of the chart 53, and the pointer 47 from zero over the scale 57, thereby integrating the flow, recording the rate thereof, and indicating the rate of flow at a given instant.

Having described my invention, I claim:

1. In a meter, the combination with a fluid conduit, of a device movable by variations of head of fluid in said conduit, mechanism comprising a cam, fulcrumed mechanism having a member engaged by said cam, one of said mechanisms being carried and reciprocable by said device, a constantly revolving device, and a device movable over said constantly revolving device by the movement of said fulcrumed mechanism.

2. In a meter, the combination with a fluid conduit, of a device operable by variations of head of fluid in said conduit, mechanism comprising a cam, mechanism comprising a lever having an arm engaging said cam, one of said mechanisms being carried and reciprocated by said device, and mechanism carried by said lever for showing the flow in said conduit.

3. In a meter, mechanism comprising oscillatory means including a registering device, mechanism comprising a cam adapted to oscillate said means, and means for supporting and reciprocating one of said mechanisms.

4. In a meter, mechanism comprising oscillatory means including an indicating device, mechanism comprising a cam adapted to oscillate said means, and means for carrying and reciprocating one of said mechanisms.

In testimony whereof I have hereunto set my name this 28th day of June, 1917.

MORO M. BORDEN.